(12) United States Patent
Sammann et al.

(10) Patent No.: US 6,901,738 B2
(45) Date of Patent: Jun. 7, 2005

(54) PULSED COMBUSTION TURBINE ENGINE

(75) Inventors: Bradley C. Sammann, East Hampton, CT (US); Wendell V. Twelves, Jr., Glastonbury, CT (US); Gary D. Jones, Jensen Beach, FL (US)

(73) Assignee: United Technologies Corporation, Hartford, CT (US)

( * ) Notice: Subject to any disclaimer, the term of this patent is extended or adjusted under 35 U.S.C. 154(b) by 67 days.

(21) Appl. No.: 10/608,939

(22) Filed: Jun. 26, 2003

(65) Prior Publication Data

US 2004/0261396 A1 Dec. 30, 2004

(51) Int. Cl.[7] .............................. F02C 5/00; F02C 5/02; F02K 3/06
(52) U.S. Cl. ........................ 60/226.1; 60/247; 60/248; 60/39.34; 60/39.38; 60/39.78
(58) Field of Search ................. 60/247, 248, 201, 60/39.38, 39.39, 39.34, 39.76–39.81, 226.1

(56) References Cited

U.S. PATENT DOCUMENTS

| | | | |
|---|---|---|---|
| 2,557,108 A | | 6/1951 | Nichols |
| 2,633,703 A | * | 4/1953 | Tenney et al. ................ 60/248 |
| 2,635,420 A | * | 4/1953 | Jonker .......................... 60/247 |
| 2,709,889 A | * | 6/1955 | Mount .......................... 60/201 |
| 2,748,564 A | | 6/1956 | Marchal et al. |
| 2,814,930 A | * | 12/1957 | Meulien et al. ............... 60/249 |
| 2,888,803 A | | 6/1959 | Pon |
| 2,930,196 A | | 3/1960 | Hertzberg et al. |
| 3,188,804 A | * | 6/1965 | Melenric ...................... 60/248 |
| 3,417,564 A | | 12/1968 | Call |
| 3,792,584 A | | 2/1974 | Klees |
| 3,898,801 A | * | 8/1975 | Grow .......................... 60/247 |
| 4,033,120 A | * | 7/1977 | Kentfield ..................... 60/249 |
| 4,175,380 A | * | 11/1979 | Baycura ....................... 60/776 |
| 4,314,444 A | | 2/1982 | Putnam et al. |
| 4,570,438 A | | 2/1986 | Lorenz |
| 5,218,816 A | | 6/1993 | Plemmons et al. |
| 5,473,885 A | | 12/1995 | Hunter, Jr. et al. |
| 5,579,633 A | | 12/1996 | Hunter, Jr. et al. |
| 5,899,660 A | | 5/1999 | Dodd |
| 5,937,635 A | | 8/1999 | Winfree et al. |
| 6,442,930 B1 | | 9/2002 | Johnson et al. |
| 2002/0139106 A1 | | 10/2002 | Meholic |

FOREIGN PATENT DOCUMENTS

| | | |
|---|---|---|
| DE | 690569 | 4/1940 |
| DE | 19850812 | 8/2000 |
| GB | 710252 | 6/1954 |
| GB | 756288 | 9/1956 |

* cited by examiner

Primary Examiner—Ted Kim
(74) Attorney, Agent, or Firm—Bachman & LaPointe, P.C.

(57) ABSTRACT

A turbine engine has a circumferential array of combustion chamber conduits downstream of the compressor and upstream of the turbine. Means are provided for directing oxygen-containing gas from the compressor to the conduits so as to cyclically feed a gas charge into each conduit through its first port and permit discharge of combustion products of the charge and fuel through both the first and second ports.

24 Claims, 7 Drawing Sheets

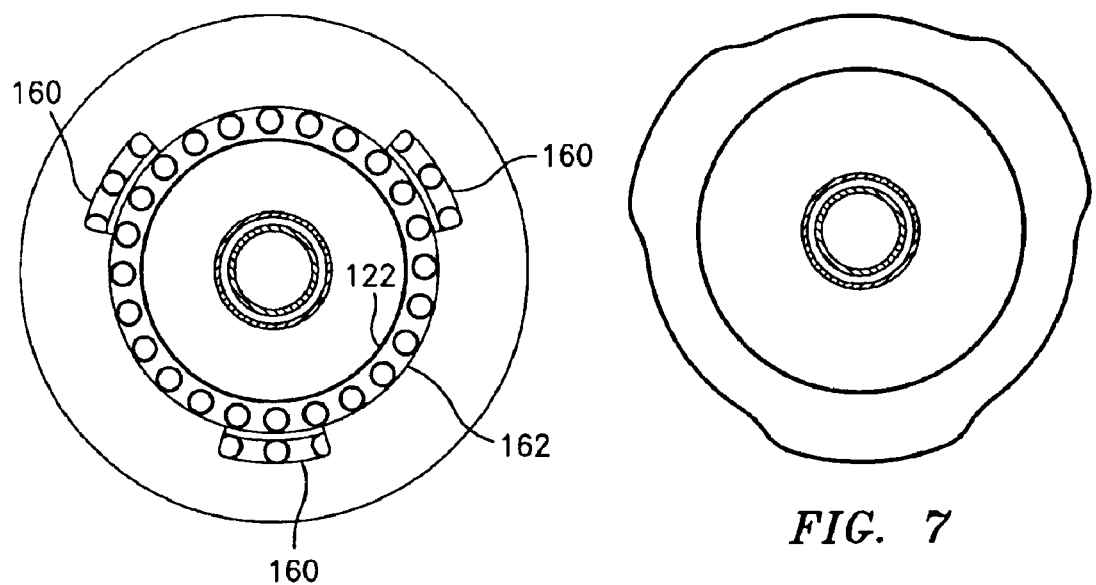
FIG. 6
FIG. 7
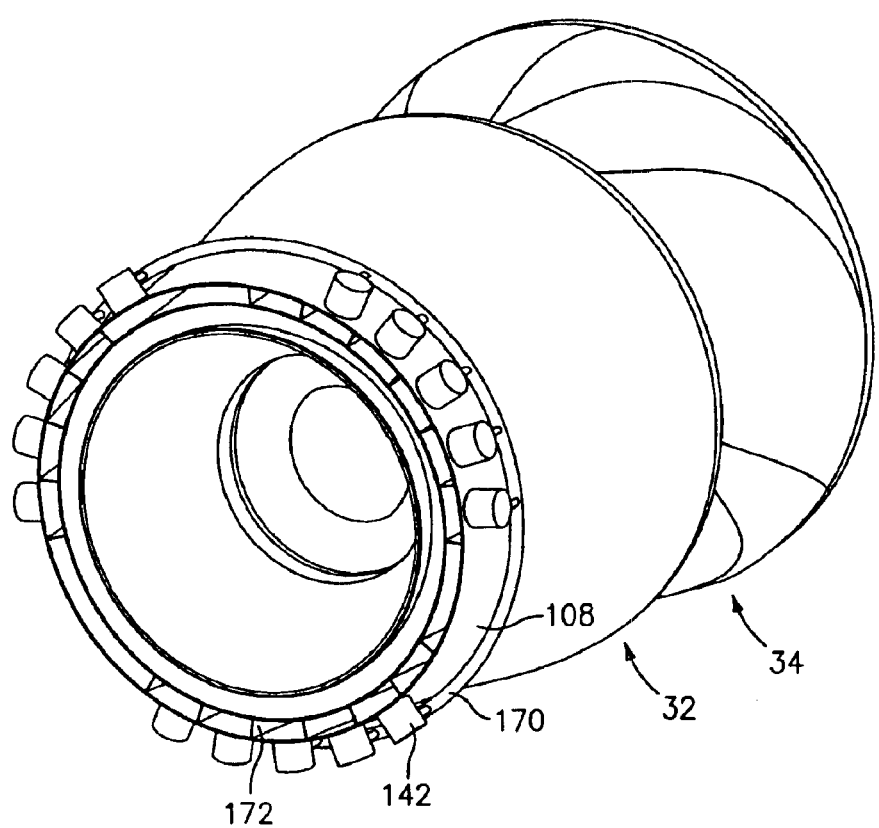
FIG. 8

PULSED COMBUSTION TURBINE ENGINE

BACKGROUND OF THE INVENTION (1) Field of the Invention

This invention relates to turbine engines, and more particularly to hybrid pulse combustion turbine engines.

(2) Description of the Related Art

Diverse pulsed combustion technologies exist. Pulse detonation engines (PDE's) represent areas of particular development. In a generalized PDE, fuel and oxidizer (e.g. oxygen-containing gas such as air) are admitted to an elongate combustion chamber at an upstream inlet end, typically through an inlet valve as a mixture. Upon introduction of this charge, the valve is closed and an igniter is utilized to detonate the charge (either directly or through a deflagration to detonation transition). A detonation wave propagates toward the outlet at supersonic speed causing substantial combustion of the fuel/air mixture before the mixture can be substantially driven from the outlet. The result of the combustion is to rapidly elevate pressure within the chamber before substantial gas can escape inertially through the outlet. The effect of this inertial confinement is to produce near constant volume combustion as distinguished, for example, from constant pressure combustion.

PDE technology has a variety of applications. A traditional application is pulsejet engines. Certain recent applications involve use in turbine or hybrid engines. U.S. Pat. No. 6,442,930 and earlier patents identify several hybrid applications. These include uses as thrust augmentors and as replacements for conventional continuous constant pressure gas turbine combustors.

BRIEF SUMMARY OF THE INVENTION

Accordingly, one aspect of the invention relates to a turbine engine having a circumferential array of combustion chamber conduits downstream of a compressor section and upstream of a turbine section. The engine has means for directing oxygen-containing gas from the compressor to the conduits so as to cyclically feed a charge into each of the conduits through a first port and permit discharge of products of combustion of the charge and fuel through both the first port and a second port. The engine may further include means for directing the products from the ports to the turbine and mixing the products with a flow from the compressor bypassing the conduits so as to present the turbine section with a circumferentially uniform flow. The conduits may rotate about an engine axis. The directing means may have at least a first portion non-rotating about the axis. The turbine and compressor each may have high and low stages on respective high and low spools and the conduits may be on a free spool. A final stage of the compressor may also be on the free spool. Rotation of the conduits may be driven by partially tangential direction of the products. There may be a first airflow through the compressor and turbine, a first portion of which passes through the combustion chamber conduits in the charges. A second portion may bypass combustion. A mass flow ratio of the first portion to the second portion may be between 1:1 and 1:3. The engine may be a turbofan and the first airflow may be a core airflow, with a bypass airflow bypassing the compressor and turbine. The combustion may comprise detonation. The engine may have a number of igniters, each of which is positioned relative to an associated one of the conduits to ignite the combustion of the charge in such conduit.

Another aspect of the invention relates to a turbofan engine. A turbine, coaxial with a compressor, drives the compressor and a fan. A pulsed combustion combustor receives air from the compressor and outputs combustion gases to the turbine. A number of combustion chamber conduits each extend along a length between first and second ends and have an outboard portion proximate the first end and an inboard portion proximate the second end. The conduits are held for rotation about the axis through a number of positions. In at least one charge-receiving position, the conduits receive a charge from upstream. In at least one initiation position, combustion of the charge is initiated. In at least one discharge position, products of the combustion are discharged. The charge may be received through the outboard portion and may partially pass therefrom into the inboard portion. The combustion products may be discharged partially through the first end and partially through the second end. The inboard portion may have a partially tangential orientation at the second end. There may be at least one fuel injector for injecting fuel into air from the compressor to form the charges. There may be at least one ring of foils rotating with the conduits as a unit.

Another aspect of the invention relates to a pulsed combustion device having a first means for receiving an airflow moving at least partially in a first axial direction and redirecting the airflow to move at least partially in an opposite second axial direction. A combustor assembly has a number of combustion conduits in a circumferential array. The array is rotatable about the axis relative to at least a portion of the first means. Each of the conduits has a first port and a second port. The first port cyclically receives a charge of the airflow and a fuel and the first and second ports cyclically discharge combustion products of the charge. At least one ignition means is positioned to initiate the combustion. The device may be located in a turbine engine having a compressor upstream of the device and a turbine downstream of the device.

The details of one or more embodiments of the invention are set forth in the accompanying drawings and the description below. Other features, objects, and advantages of the invention will be apparent from the description and drawings, and from the claims.

BRIEF DESCRIPTION OF THE DRAWINGS

FIG. 6 is a partial sectional view of the engine of FIG. 1 taken along line 6—6.

FIG. 7 is a partial sectional view of the engine of FIG. 1 taken along line 7—7.

FIG. 8 is an isolated view of a combustor and mixing duct subassembly of the engine of FIG. 1.

Like reference numbers and designations in the various drawings indicate like elements.

DETAILED DESCRIPTION

Figure 1:
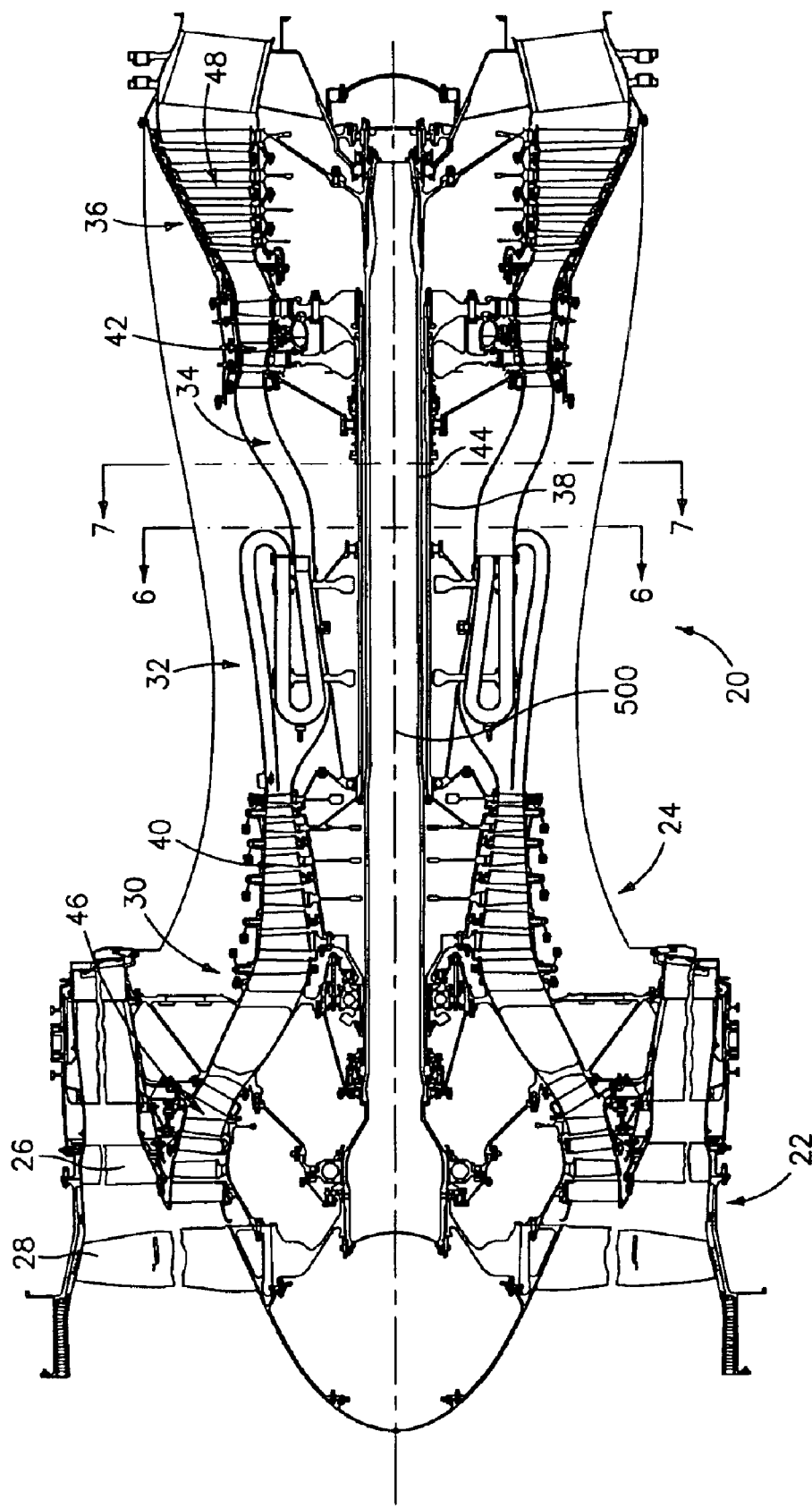
FIG. 1 is a partial longitudinal sectional view of a turbofan engine.

FIG. 1 shows a turbofan engine 20 having a duct 22 and a core 24. The duct is supported relative to the core by vanes 26. Of inlet air entering the duct, a fan 28 drives a bypass portion along a first flowpath radially between the duct and the core and core portion along a second flowpath through the core. In the core downstream of the fan, a compressor section 30 having alternating rings of rotor blades and stator vanes compresses the core air and delivers it further downstream to a combustor section 32 where it is mixed with fuel and combusted. A combustion bypass portion of the core air may bypass the combustion within the combustor and be mixed with the combustion portion in a mixing duct 34 downstream of the combustor. Downstream of the mixing duct, a turbine section 36 is driven by the mixing duct output to in turn drive the compressor and fan. An augmentor (not shown) may be located downstream of the turbine.

The exemplary engine has three spools: high and low speed spools; and a free spool. The high speed spool includes a high speed shaft 38 and disks and blades of a high speed (and pressure) portion 40 of the compressor section 30 and of a high speed (and pressure) portion 42 of the turbine section 36. The low spool includes a low speed shaft 44 and the disks and blades of low speed (and pressure) portions 46 and 48 of the compressor and turbine sections. The spools rotate coaxially about the engine central longitudinal axis or centerline 500. The high compressor portion 40 is driven by the high turbine portion 42. The fan 28 and low compressor portion 46 are driven by the low turbine portion 48.

Figure 2:
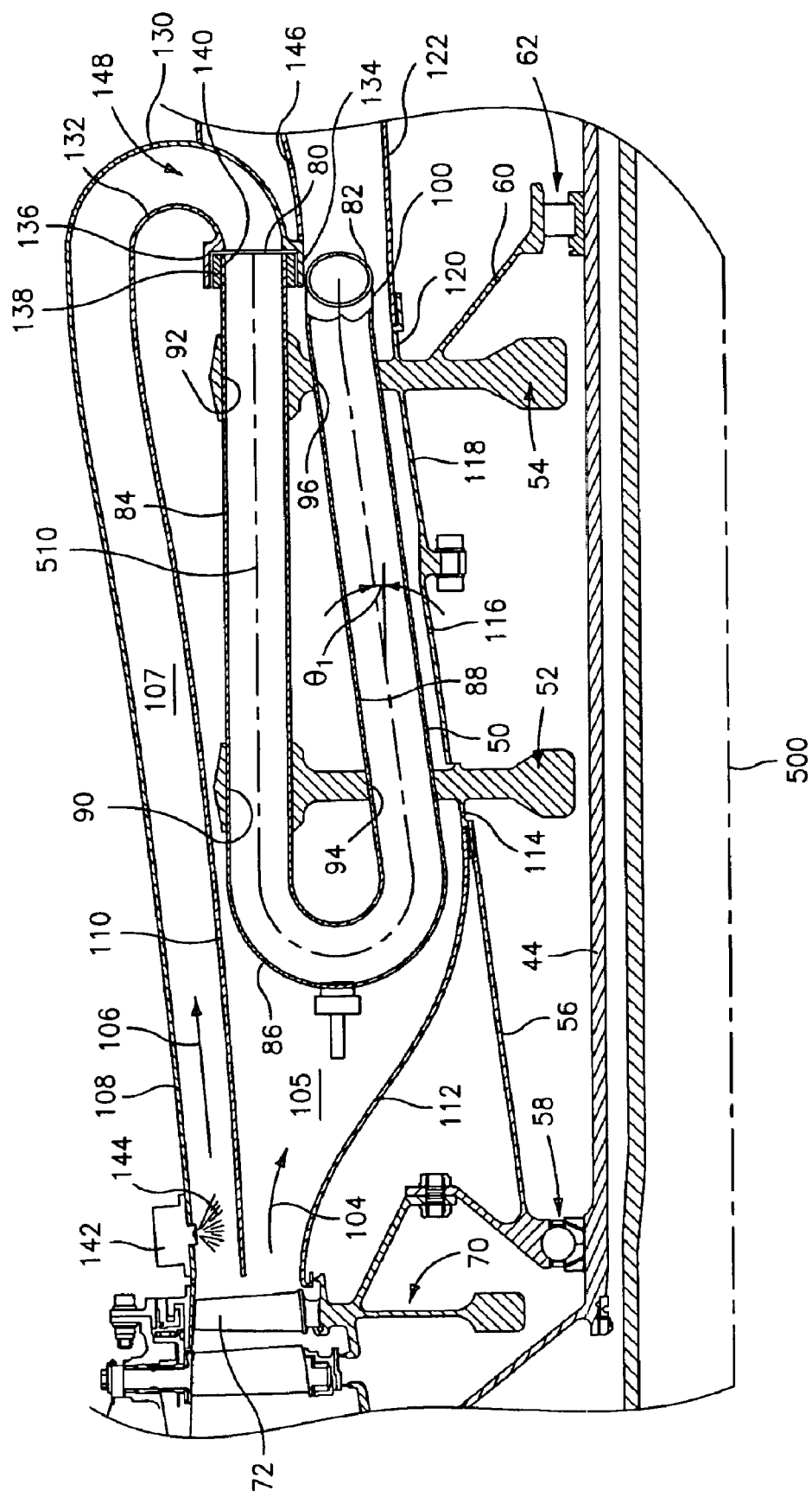
FIG. 2 is a partial longitudinal sectional view of a combustor the engine of FIG. 1 along a charging sector.

The free spool comprises a circumferential array of combustor tubes 50 (FIG. 2). The tubes are held by a pair of fore and aft disks 52 and 54. At a forward end of a web 56 extending forward from the fore disk 52, a ball bearing system 58 connects the free spool to the high spool shaft. Similarly, at the aft end of a web 60 extending aft from the aft disk 54, a roller bearing system 62 connects the free spool to the high spool shaft 38. The free spool further includes a disk 70 carrying the last stage blades 72 of the compressor section 30. In the exemplary embodiment, the three disks of the free spool are separately formed (e.g., via casting and machining) then securely fastened to each other (e.g., via bolting).

Figure 3:
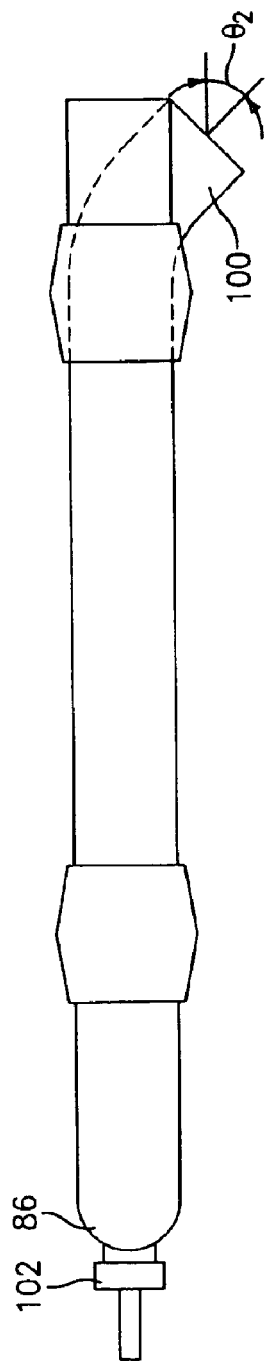
FIG. 3 is a radially inward view of a combustion tube of the combustor of FIG. 2.

Each exemplary tube 50 is formed as a generally u-shaped tube of circular cross-section having a centerline 510 and extending from a first end 80 to a second end 82. A first leg 84 of the tube extends from the first end 80 forward to a transition 86. A second leg 88 extends forward from the second end 82 to the transition 86. In the exemplary embodiment, the first leg 84 is straight and extends parallel to the axis 500. The first leg 84 is secured within radially outboard apertures 90 and 92 of the fore and aft disks 52 and 54. An exemplary transition 86 is slightly more than a semitoroid, extending radially from a forward end of the first leg 84 inward to a forward end of the second leg 88. In the exemplary embodiment, the major portion of second leg 88 extends approximately coplanar to the first leg and the axis 500 but at a slight angle $\theta_1$ thereto. The second leg is secured within apertures 94 and 96 of the fore and aft disks 52 and 54. An aft portion 100 of the second leg 88 is directed at least partially tangentially. In the exemplary embodiment, the aft portion 100 is nearly skew to the axis 500 and local longitudinal centerplane of the engine by an angle $\theta_2$ (FIG. 3). An igniter 102 is mounted to the tube. An exemplary mounting location for a single igniter is at the apex or forwardmost portion of the transition 86.

In the exemplary embodiment, a core flowpath (FIG. 2) from the compressor has two main portions: an inboard portion 104 in an inboard duct 105; and an outboard portion 106 in an outboard duct 107. In the exemplary embodiment, the outboard flowpath 106/duct 107 is bounded on an outboard side by an inboard surface of a non-rotating outer core wall 108. The paths 104 and 106 and their associated ducts are separated by a non-rotating intermediate wall 110 running generally parallel to the outer wall 108. In the exemplary embodiment, the inboard flowpath 104/duct 105 is bounded on its inboard side by a combination of an outboard duct wall 112 extending aft from an outboard platform portion of the disk 70 to a platform stub 114 of the disk 52 where it merges with the web 56. Further downstream, the flowpath 104/duct 105 is bounded by outboard surfaces of respective aft and fore platforms 116 and 118 of the disks 52 and 54. The disk 54 has an aft platform 120 having a shoulder interfitting with a fixed inner wall 122 of the mixing duct 34 to continue the flowpath 104 into the mixing duct 34. This interfitting permits relative rotation.

The intermediate wall 110 serves to divide the core flow into the paths 104 and 106. Along charging sectors of the circumference of the core, the outer wall 108 and intermediate wall 110 diverge generally radially outward from fore-to-aft and upstream-to-downstream until approximately the longitudinal location of the tube first ends 80. Downstream thereof, the walls 108 and 110 turn radially inward and eventually back forward at respective aft portions 130 and 132. In the exemplary embodiment, the outer and intermediate walls 108 and 110 extend further inward and forward to meet the tube first ends 80, with interior surfaces of the walls being approximately aligned with interior surfaces of the tubes. End portions 134 and 136 of the walls 108 and 110 diverge respectively inward and outward to accommodate a ring 138 having apertures 140 into which the first end portions of each tube are secured. The exemplary ring has no other apertures.

Figure 4:
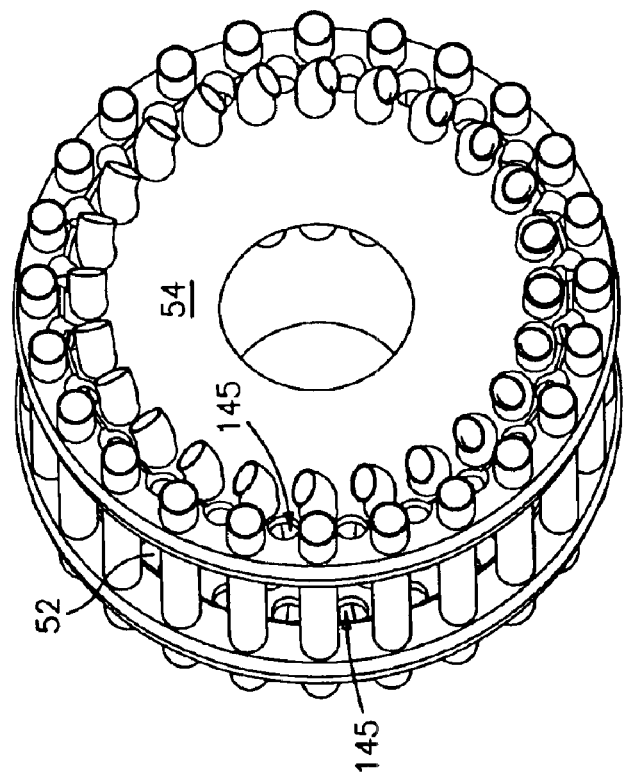
FIG. 4 is a view of the combustor of FIG. 2.

A plurality of fuel injectors 142 are secured in the outer core wall 108 to introduce fuel 144 into the combination portion of core air flowing along/in the outboard flowpath 106/duct 107. With the tubes in the charging sectors, the combustion bypass portion of core air flowing along/in the inboard flowpath 104/duct 105 passes around the tubes 50 through associated apertures 145 (FIG. 4) in the disks 52 and 54 between the tubes. That portion passes around the tube second end 82 into the mixing duct 34 between its inboard wall 122 and outboard wall 146. Along this charging sector, the inboard and outboard walls 122 and 146 tend to be relatively close to each other at their forward ends, with the inboard wall 122 being slightly inboard of the tube second ends 82 and the outboard wall being approximately radially between the tube ends 80 and 82. Along this charging sector, the combustion portion of the core air passes along in the outboard flowpath 106/duct 107, mixing with the fuel 144 at an upstream end of the flowpath 106/duct 107. This flowpath extends generally rearward, then turns inward and forward in a downstream flowpath area 148 between the aft portions 130 and 132 of the walls 108 and 110. This flow portion (including/carrying the injected fuel) then proceeds through the tube first ends 80, forwardly through the first legs 84, through the transitions 86, and then through the second legs 88 toward the second ends 82.

Figure 5:
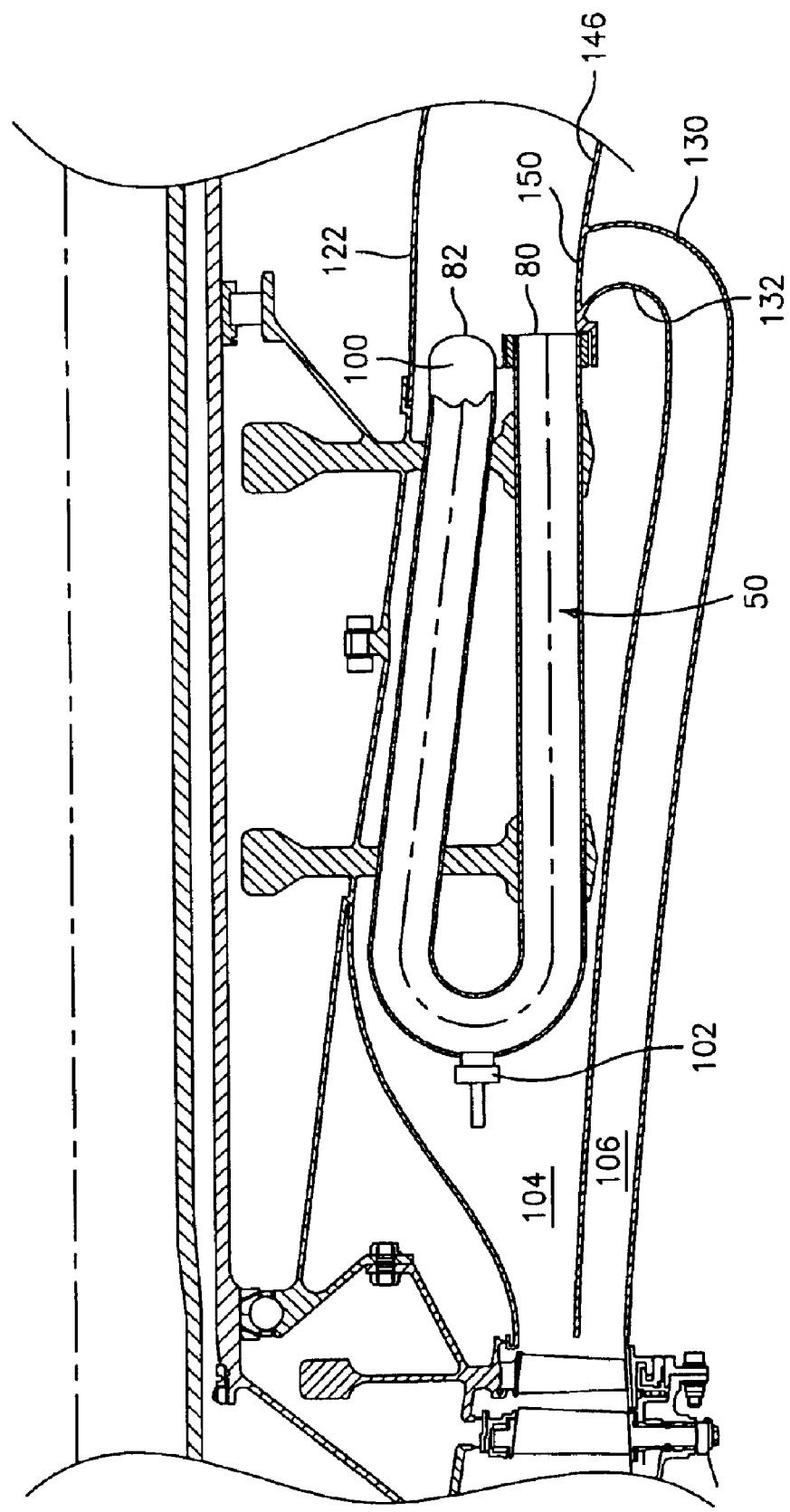
FIG. 5 is a partial longitudinal sectional view of the combustor of the engine of FIG. 1 along a discharging sector.

As the free spool rotates, each tube transiently progresses through a charging sector to a subsequent discharging sector. FIG. 5 shows a tube 50 in a discharging sector. In the exemplary implementation, along the discharging sectors the flow is still divided into inboard and outboard flowpaths 104 and 106 bounded by generally the same surfaces of the same elements as in the charging sector of FIG. 2. In the discharging sector, however, the wall aft portions 130 and 132 and thus the outboard duct 107 terminate proximate an outboard extreme of the adjacent tube first ends 80 so that the outer core flowpath 106/duct 107 is locally blocked by the outboard surface of a forward continuation 150 of the mixing duct outboard wall 146. Along this discharging sector, the front end of the outboard wall 146 is relatively far apart from the adjacent portion of the inboard wall 122. Thus along this sector, both tube ends 80 and 82 are open to the interior of the mixing duct. The local blocking of the flowpath 106/duct 107 causes flow therethrough to be directed generally tangentially toward an adjacent charging sector. In the exemplary implementation, along the discharging sectors there are no fuel injectors. The inboard flowpath 104 may proceed as in the charging sector.

Figure 9:
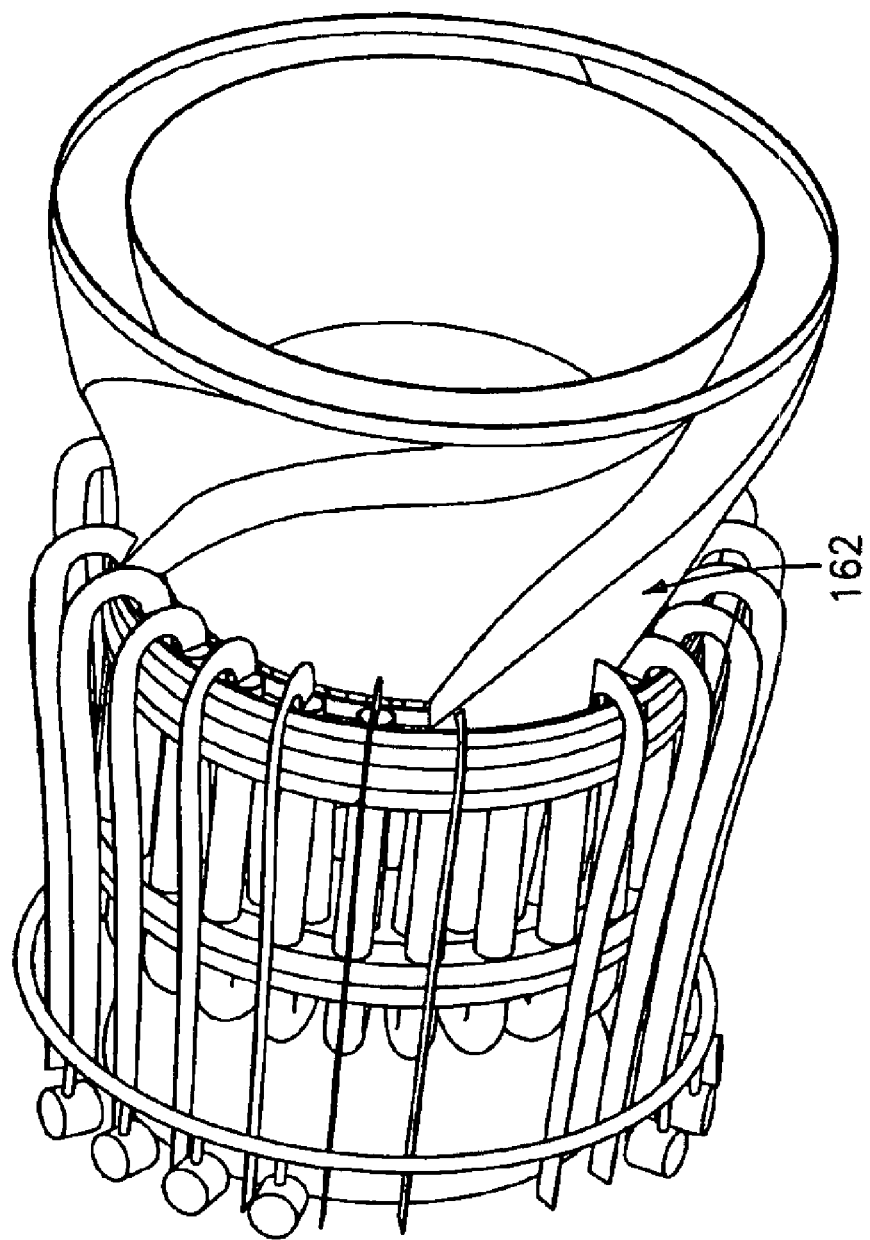
FIG. 9 is a view of the subassembly of FIG. 8 with combustor core walls removed to show detail.
Figure 10:
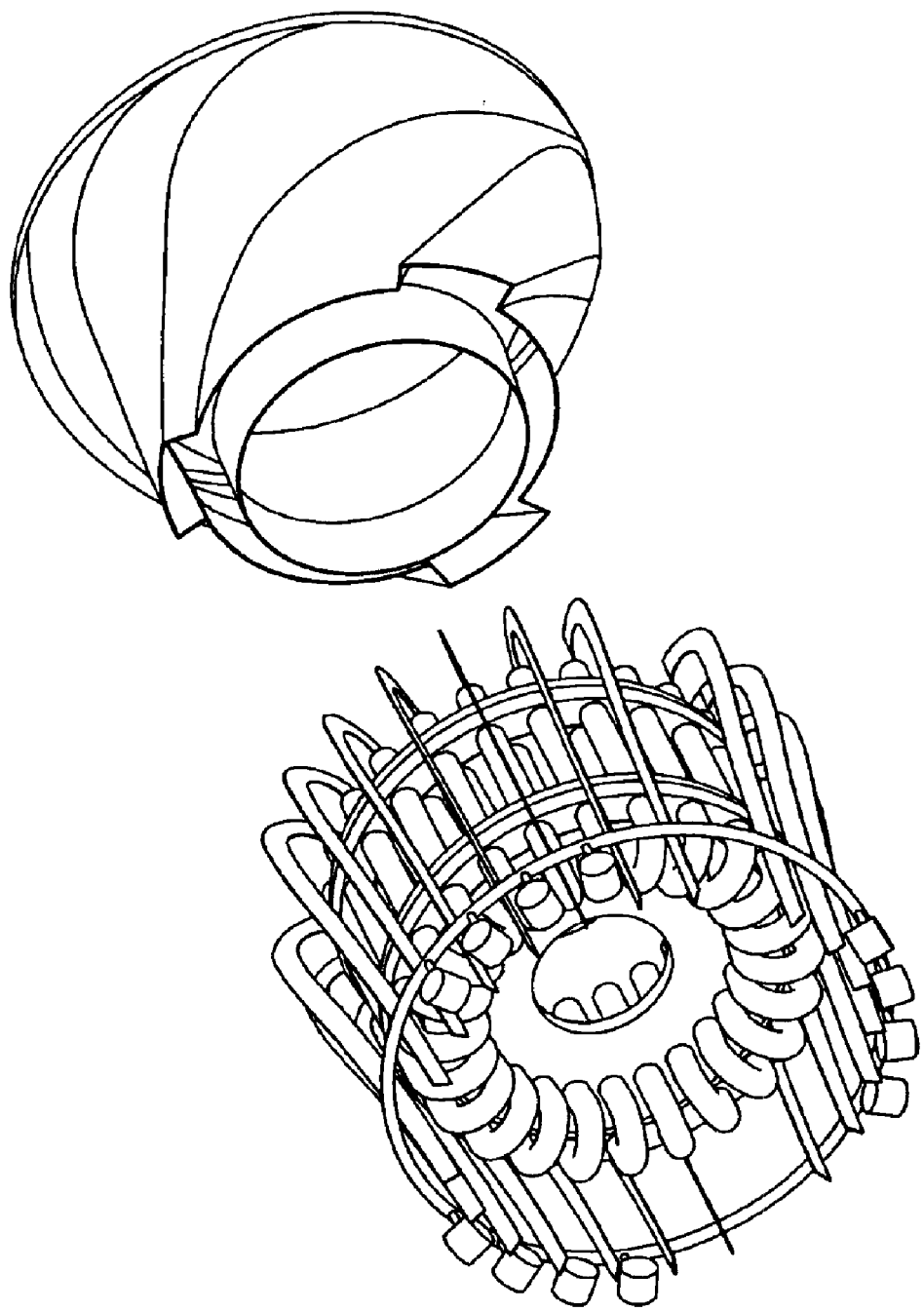
FIG. 10 is an exploded view of the subassembly of FIG. 9.

FIGS. 8–10 show further details of the exemplary combustor 32 and mixing duct 34. The fuel injectors 142 are shown mounted in the outer core wall 108 in an exemplary three groups of five injectors. The injectors have bodies extending outboard from the wall 108 with inlets coupled to a single common fuel rail 170 for delivering fuel to the injectors. Injector outlets may be flush, subflush, or slightly protruding from the inboard surface of the wall 108. Extending slightly radially inward and aft from the inboard surface of the wall 108 are a plurality of guide walls 172. The exemplary guide walls are positioned between adjacent injectors of each group and at the outboard extremes of the groups. The guide walls serve to encourage uniform mixing of the fuel and air.

As a tube 50 rotates to the beginning of each discharging sector, its igniter 102 is triggered to ignite the fuel/air mixture within the tube 50. Exemplary igniters may take the form of sparkplugs rotating past magneto points (not shown) or otherwise having a wiring harness (not shown) coupling the igniters to electrical contacts spanning the rotating and non-rotating portions of the engine (e.g., as in various distributor constructions and techniques).

The flame front resulting from the ignition simultaneously propagates rearward down both legs of the tube causing combustion products to be expelled from both the ends 80 and 82. The expulsion from both ends of a single tube may simplify or eliminate sealing considerations (e.g., as compared with the situation where a valve structure seals an inlet end of a tube so that combustion products are exclusively expelled from an outlet end).

The angling of the aft portion 100 produces tangential thrust to drive the rotation of the free spool. In the exemplary embodiment, this applies sufficient torque to rotate the free spool at a desired rotational speed. In an exemplary three spool engine, an exemplary steady state rotational speed of the carousel is 1500–4500 RPM. The specific operating range will be influenced by engine dimensional considerations in view of carousel structural integrity and the number of charge/discharge cycles per rotation. A narrower range of 2500–3500 target RPM is likely with the lower third of this range more likely for the exemplary three cycle/rotation engine and the upper third for a one cycle/rotation engine. In operation, these speeds will likely be substantially lower than the high spool speed and approximately the same or moderately lower than the low spool speed. Other variations and embellishments may relate to or control rotation of the free spool. These may include the presence of additional rotating blades or fixed vanes. An initial rotation may be provided by the engine starter motor (not shown) or by a dedicated starter motor (not shown) for the combustor.

The combustion products discharged from the tube ends 80 and 82 mix with the air in the flowpath 104 at the front end of the mixing duct 30, mixing more fully as the combined flow moves aft/downstream. The mixing duct outer wall 146, which locally forms a portion of the core outer wall, has radially elevated portions or humps 160 at the duct front end aligned with the discharge sectors and intervening inboard portions 162 at the duct front end aligned with the charging sectors. Progressing rearward from the front end of the mixing duct, both the inboard and outboard walls 122 and 126 diverge generally radially outwardly to join inner and outer core walls at the high turbine 42. During this transition, however, the elevated portions 160 broaden until the outer wall 146 is essentially annular at the aft end of the mixing duct. The humps also are disposed helically in accordance with the normal operating tangential velocity component of gases exiting the combustor. Presenting a relatively uniform mixing duct cross section to the face of the high pressure high turbine, the mixing duct acts as a pulse dampener to smooth out the flow presented to the turbine.

The magnitude of the pressure pulses from the individual combustion tubes is minimized by the apparent high firing frequency (e.g., 1000 Hz to 6000 Hz) provided by the rotating tube pack. The pressure pulses may overlap at a relatively uniform peak level resulting in a quasi-steady state effluent pressure. Additional viscous dampening of any residual small cyclical pressure variations may occur in the mixing duct.

In the exemplary embodiment, the combustion tubes 50 may be operated in a detonation mode. In such a mode, when triggered, each igniter produces a detonation pulse which propagates a flame front radially outward from an associated ignition point at a supersonic speed (e.g., over about 3,000 feet per second (fps) any typically in the range of 4,000–6,000 fps). Near total combustion will be achieved in the time required for the flame front to travel to the tube ends (half the total tube length). In an exemplary detonation operation, the operating pressure ratio (OPR) of the combustion tubes may generally be between two and six.

Alternative embodiments might operate in a deflagration mode. This might be achieved by using a multi-igniter, multi-point ignition system. Various embellishments may be made involving the positioning of the igniters and their trigger timing to achieve desired combustion parameters. In addition to discrete multi-point ignition, there may be continuous (e.g., laser or ion or other energy beam) or multi-continuous ignition. In such a deflagration mode, with a sufficiently high number of ignition points (and a sufficiently small spacing therebetween) substantial combustion can be achieved through subsonic deflagration in a sufficiently short time that may approach or even be shorter than that of the detonation system. With a short enough combustion time, the inertial confinement of the gas in the tube (the tube ends both being open at the discharge sector) is effective to achieve near constant volume combustion. The resulting effect can be achievement of efficiencies similar to the detonation system without some or all of the attendant drawbacks (e.g., narrow operating parameters, supplemental oxygen, exotic chamber geometries, noise, and the like). In a deflagration mode, the flame fronts propagate outwards from their ignition point(s) at a subsonic speed (e.g., under about 2,000 feet per second (fps) any typically in the vicinity of 1,000 fps). Hypothetical deflagration devices may operate in a broad performance envelope. The exemplary OPR's may be between 1.5 and five. The low end of the spectrum might be typical for ram-fed applications and the high end for pre-compression applications. Basic applications include use as pulsejet engines. In an exemplary ram-fed pulsejet engine, inlet air is fed into the device due to the movement of the vehicle through the air and the exhaust expelled from the outlet as thrust.

In exemplary embodiments, there may be between ten and fifty combustion tubes, more narrowly, twenty and forty. Exemplary tube lengths (and the approximately similar combustion chamber lengths) are between forty cm and one m, more narrowly, sixty cm and eighty cm. The exemplary tube cross sectional areas are between eight $cm^2$ and seventy $cm^2$, more narrowly, fifteen $cm^2$ and fifty $cm^2$. The exemplary engine has three pairs of charging and discharging sectors so that each combustion tube undergoes three charge/discharge cycles in one rotational cycle. Other numbers of pairs are possible (e.g., 1–10 pairs). The number of mixing duct humps or other related features would vary correspondingly. Each charging sector may be larger than its associated discharging sector. In the exemplary three cycle embodiment, an exemplary charging sector is approximately 86° and an exemplary discharging sector is approximately 33°. The key limitation regarding size of the charging sector is the time required to charge the combustion tubes at a given radius from the engine axis and rotational speed.

One or more embodiments of the present invention have been described. Nevertheless, it will be understood that various modifications may be made without departing from the spirit and scope of the invention. For example, one possible variation is to have the tubes nonrotating but have a rotating manifold structure. Various additional structure may be added, such as having turning vanes or a turbine stage on the free spool. Additionally, the principles may be applied to various turbine applications and to nonturbine applications. An exemplary nonturbine application is used as a rotating pulse jet. Accordingly, other embodiments are within the scope of the following claims.

What is claimed is:

1. A turbine engine comprising:
   a compressor section;
   a turbine section;
   a circumferential array of combustion chamber conduits held for rotation about an engine axis, the conduits being downstream of the compressor section and upstream of the turbine section and having first and second ports; and
   means for directing oxygen-containing gas from the compressor section to the combustion chamber conduits as the conduits rotate about the engine axis so as to cyclically:
      feed a charge of said gas into each of the conduits through the first port of such conduit; and
      permit discharge of products of combustion of said charge and a fuel through said first port and said second port.

2. The engine of claim 1 further comprising:
   means for directing said products of combustion of said charge from said first port and said second port to said turbine section and mixing said products with a flow from the compressor bypassing the combustion chamber conduits so as to present the turbine section with a circumferentially uniform flow.

3. The engine of claim 1 wherein:
   the means for directing comprises at least a first portion non-rotating about the engine axis.

4. The engine of claim 3 wherein said turbine and compressor sections each comprise high and low stages on respective high speed and low speed spools and the circumferential array of combustion chamber conduits is on a free spool.

5. The engine of claim 4 wherein a final stage of the compressor section is on said free spool.

6. The engine of claim 3 wherein the array is on a free spool and rotation of the array is driven by partially tangential direction of the products of combustion.

7. The engine of claim 1 wherein there is a first airflow substantially through said compressor and turbine sections and wherein a first portion of the first airflow passes through the combustion chamber conduits in the charges and a second portion of the first airflow bypasses combustion and a mass flow ratio of the first portion to the second portion is between 1:1 and 1:3.

8. The engine of claim 7 wherein the engine is a turbofan and the first airflow is a core airflow and a bypass airflow bypasses the compressor and turbine sections.

9. The engine of claim 1 wherein said combustion comprises detonation.

10. The engine of claim 1 further comprising a plurality of igniters, each of which is positioned relative to an associated one of the conduits to ignite the combustion of the charge in said associated conduit.

11. The engine of claim 1 wherein:
   said charge of said gas is fed into each of the conduits through the first port of such conduit with said fuel and not thorough the second port.

12. A turbofan engine comprising:
   a fan;
   a compressor having;
   a turbine coaxial with the compressor along an axis and driving the compressor and fan;
   a pulsed combustion combustor receiving air from the compressor and outputting combustion gasses to the turbine and having:
      a plurality of combustion chamber conduits each extending along a length between first and second ends and having an outboard portion proximate the first end and an inboard portion proximate the second end and held for rotation about the axis through a plurality of positions, including:
         at least one charge-receiving position for receiving a charge from upstream;
         at least one initiation position for initiating combustion of the charge; and
         at least one discharge position for downstream discharging of products of combustion of said charge.

13. The engine of claim 12 wherein:
   the charge is received through the outboard portion and partially passes therefrom into the inboard portion; and
   the combustion products are discharged partially through the first end and partially through the second end.

14. The engine of claim 12 wherein:
   the inboard portion has a partially tangential orientation at the second end.

15. The engine of claim 12 further comprising at least one fuel injector for injecting fuel into air from the compressor to form the charges.

16. The engine of claim 12 further comprising at least one ring of foils rotating with the conduits as a unit.

17. A pulsed combustion device comprising:
   first means for receiving an air flow moving at least partially in a first axial direction and redirecting the flow to move at least partially in a second axial direction, opposite said first axial direction; and
   a combustor assembly comprising:
      a plurality of combustion conduits in a circumferential array, the array rotatable about the axis relative to at least a portion of the first means, each of said conduits having:
a first port; and
a second port, the first port cyclically receiving a charge of said airflow and a fuel and the first and second ports cyclically discharging combustion products of the charge; and
at least one ignition means positioned to initiate said combustion.

18. The device of claim 17 in a turbine engine further comprising:
a compressor upstream of the pulsed combustion device; and
a turbine downstream of the pulsed combustion device.

19. A turbine engine comprising:
a compressor section;
a turbine section;
a circumferential array of combustion chamber conduits, the conduits being downstream of the compressor section and upstream of the turbine section and having first and second ports; and
means for directing oxygen-containing gas from the compressor section to the combustion chamber conduits so as to cyclically:
feed a charge of said gas into each of the conduits forwardly through the first port of such conduit; and
permit discharge of products of combustion of said charge and a fuel rearwardly through both said first port and said second port.

20. A turbine engine comprising:
a compressor section;
a turbine section;
a circumferential array of combustion chamber conduits rotating about an engine axis, the conduits being downstream of the compressor section and upstream of the turbine section and having first and second ports; and
means for directing oxygen-containing gas from the compressor section to the combustion chamber conduits so as to cyclically:
feed a charge of said gas into each of the conduits through the first port of such conduit; and
permit discharge of products of combustion of said charge and a fuel through said first port and said second port,
the means for directing comprising at least a first portion non-rotating about the engine axis.

21. The engine of claim 20 wherein said turbine and compressor sections each comprise high and low stages on respective high speed and low speed spools and the circumferential array of combustion chamber conduits is on a free spool.

22. The engine of claim 21 wherein a final stage of the compressor section is on said free spool.

23. The engine of claim 20 wherein the array is on a free spool and rotation of the array is driven by partially tangential direction of the products of combustion.

24. A turbine engine comprising:
a compressor section;
a turbine section;
a circumferential array of combustion chamber conduits, the conduits being downstream of the compressor section an upstream of the turbine section and having first and second ports; and
means for directing oxygen-containing gas from the compressor section to the combustion chamber conduits so as to cyclically:
feed a charge of said gas into each of the conduits through the first port of such conduit; and
permit discharge of products of combustion of said charge and a fuel through said first port and said second port, said combustion comprising detonation.

* * * * *